(12) United States Patent
Nagamoto

(10) Patent No.: US 7,135,226 B1
(45) Date of Patent: Nov. 14, 2006

(54) COMPOSITE FABRIC PRODUCT AND METHOD OF MANUFACTURING THE SAME

(76) Inventor: Steve Nagamoto, 15 Redcrown, Mission Viejo, CA (US) 92692

( * ) Notice: Subject to any disclaimer, the term of this patent is extended or adjusted under 35 U.S.C. 154(b) by 0 days.

(21) Appl. No.: 10/951,921

(22) Filed: Sep. 27, 2004

Related U.S. Application Data

(60) Provisional application No. 60/507,578, filed on Sep. 30, 2003.

(51) Int. Cl.
*D02G 3/00* (2006.01)

(52) U.S. Cl. ............ 428/365; 428/375; 428/114; 428/293.4; 428/475.5; 442/202; 442/164; 442/201; 442/311

(58) Field of Classification Search ........ 433/199, 433/201, 196, 202, 311, 305, 164; 428/375, 428/364, 365, 378, 392, 114, 475.5; 528/353, 528/125
See application file for complete search history.

(56) References Cited

U.S. PATENT DOCUMENTS

| | | | | |
|---|---|---|---|---|
| 3,784,433 A | | 1/1974 | Garnish et al. ........... 156/276 |
| 4,244,765 A | | 1/1981 | Tokuno ................ 156/180 |
| 4,252,592 A | | 2/1981 | Green ................... 156/272 |
| 4,894,012 A | * | 1/1990 | Goldberg et al. ......... 433/215 |
| 4,963,408 A | | 10/1990 | Huegli ................. 428/71 |
| 5,132,394 A | * | 7/1992 | Bockrath ............... 528/353 |
| 5,160,472 A | | 11/1992 | Zachariades ............ 264/136 |
| 6,242,090 B1 | | 6/2001 | Green et al. ............ 428/354 |
| 6,399,199 B1 | | 6/2002 | Fujino et al. ............ 428/396 |
| 6,565,944 B1 | | 5/2003 | Hartness et al. .......... 428/109 |
| 6,599,610 B1 | | 7/2003 | Homma et al. ........... 428/102 |

OTHER PUBLICATIONS

U.S. Appl. No. 10/034,253, filed Sep. 12, 2002, Tilley.

\* cited by examiner

*Primary Examiner*—Merrick Dixon
(74) *Attorney, Agent, or Firm*—Cislo & Thomas, LLP

(57) ABSTRACT

A manufacturing method for a composite fabric material is disclosed, which includes: holding a bundle of fibers under tension, the fiber being continuous filaments of carbon fibers, aramid fibers, or glass fibers, etc.; placing a layer of a matrix material over and under the fiber bundle, the matrix material being a thermoplastic adhesive material such as polyamide resins, thermoplastic polyurethane, or polyester, etc.; heating the matrix material to melt it and applying a pressure on the layers while the fiber bundle is under tension; and cooling the layers, whereby the fibers are locked in place by the adhesive. Composite material layers produced by the above steps may be laminated and further processed or formed as desired. The composite fabric materials manufactured by this method have superior tensile properties, compression properties, impact properties, and impact dispersion and propagation properties compared to composite fabric materials made with conventional methods.

5 Claims, 1 Drawing Sheet

COMPOSITE FABRIC PRODUCT AND METHOD OF MANUFACTURING THE SAME

CROSS-REFERENCES TO RELATED APPLICATIONS

This patent application claims priority from U.S. Patent Application Ser. No. 60/507,578 filed Sep. 30, 2003 for COMPOSITE FABRIC PRODUCT AND METHOD OF MANUFACTURING THE SAME, which application is incorporated herein in its entirety by this reference thereto.

BACKGROUND OF THE INVENTION

1. Field of the Invention

This invention relates to composite fabric materials made of reinforcing fibers such as carbon fibers and a matrix, and a manufacturing process thereof.

2. Description of the Related Art

Composite fabric materials, or fiber-reinforced plastic materials, have been widely used as component materials of aircrafts, boats, sporting goods and other items. In composite fabric materials made of fibers such as carbon fibers, fiber bundles (yarns, also referred to as tows when the fibers are unidirectional) are typically held together by an adhesive material. One existing method of producing such a material uses a "prepreg" formed by impregnating carbon fiber bundles with an epoxy resin composition or other adhesive material. One example where such a method is used is described in U.S. Pat. No. 6,399,199, entitled "Prepreg and carbon fiber reinforced composite materials". Another existing method uses yarns that are stitched together with a thread such as cloth, polyester or s-glass thread. One example of a stitched laminate is described in U.S. Pat. No. 6,599,610, entitled "Multiaxially stitched base material for reinforcing and fiber reinforced plastic, and method for preparing them". Another example of a fiber reinforced material and method of making such is described in U.S. Pat. No. 6,565,944, entitled "Resin composition, a fiber reinforced material having a partially impregnated resin and composites made therefrom". This method involves stitching a stack of partially impregnated preforms together prior to curing to form a fiber-reinforced resin composite upon curing. One disadvantage of composite fabric materials made by the conventional methods is that they tend to be stiff and difficult to work with and thus unsuitable for certain applications.

SUMMARY OF THE INVENTION

The present invention is directed to a method of manufacturing a composite fabric material and such material that substantially obviate one or more of the problems due to limitations and disadvantages of the related art.

An object of the present invention is to provide a composite fabric material that has superior tensile properties, compression properties, impact properties, and impact dispersion and propagation properties.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for manufacturing a composite fabric material, the method including: (a) holding a bundle of continuous fibers under tension; (b) placing one or more layers of a matrix material over and/or under the fiber bundle; (c) heating the layers of matrix material and the fiber bundle, the heating being sufficient to melt the adhesive material; (d) applying a pressure on the heated layers of matrix material and the fiber bundle while the fiber bundle is held under tension; and (e) cooling the resulting product of step (d).

In another aspect, the present invention provides a composite fabric product having superior tensile properties, compression properties, impact properties, and impact dispersion and propagation properties.

It is to be understood that both the foregoing general description and the following detailed description are exemplary and explanatory and are intended to provide further explanation of the invention as claimed.

DESCRIPTION OF THE PREFERRED EMBODIMENT(S)

Figure 1:
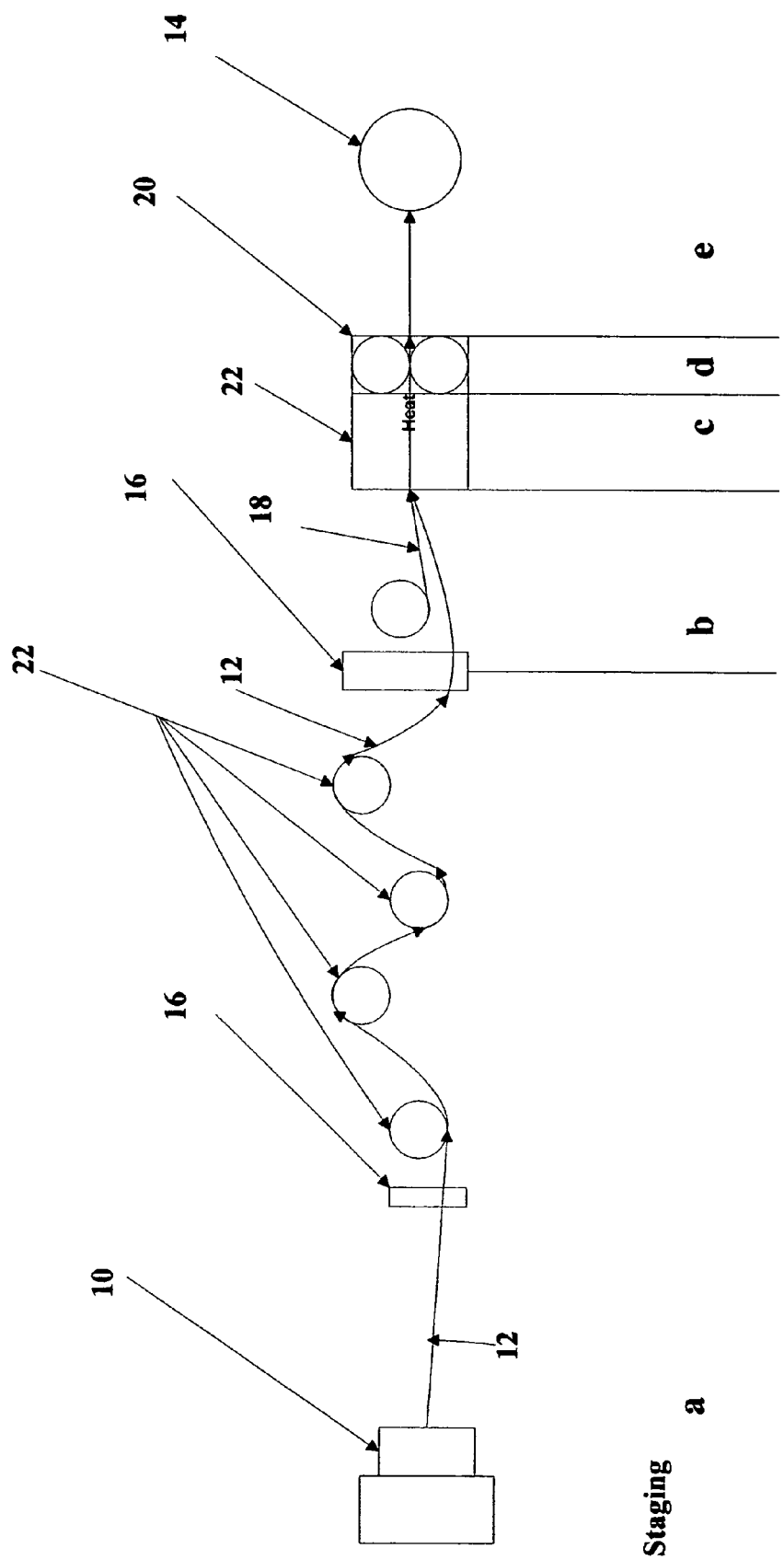
FIG. 1 illustrates an apparatus used in the manufacturing method according to an embodiment of the present invention.

A manufacturing method for a composite fabric material according to an embodiment of the present invention includes the following steps. (1) Holding a bundle of fibers under tension. The fiber bundle is made of continuous filaments of carbon fibers, aramid fibers, S-Glass fibers, E-Glass fibers, or the like, or a hybrid of such fibers, and maybe a unidirectional or woven fabric. (2) Placing a layer (i.e., a web or veil) of a matrix material over and/or under the fiber bundle. The matrix material is a thermoplastic adhesive material, examples of which include polyamide resins such as nylon-12, thermoplastic polyurethane (TPU), polyester, or the like. (3) Heating and applying a pressure on the layers, which melts the adhesive. This step, which is sometimes referred to as "ironing", is performed with the fiber bundle held under tension. (4) Cooling the ironed layers, whereby the yarns of the unidirectional or woven fabric are locked in place by the adhesive. The adhesive creates a hardening in the matrix on the fabric. Layers produced by steps (1)–(4) may be laminated and further processed or formed as desired.

The manufacturing process is described in more detail with reference to FIG. 1. As shown in FIG. 1, a creel 10 or other suitable device is used to hold a spool or spools of fiber bundle 12 (yarn) at the front end, and a take up reel (not shown) or other suitable device is used to hold a roll of the finished product 14, sometimes referred to as a "tape", at the back end. The fiber bundles 12 are made of continuous filaments of carbon fibers, aramid fibers, S-Glass fibers, E-Glass fibers, or the like, or a hybrid of such fibers. One preferred example is commercially available carbon fiber bundles in the form of a tape. The present inventor has used a fiber bundle product G30-700 available from Toho Carbon Fibers, Inc. Other suitable products may of course be used. A bundle of a large number of untwisted unidirectional fibers is sometimes referred to as a tow, and each tow may comprise from hundreds to hundreds of thousand fibers. Bundles having 160 to 700 fibers have been used by the present inventor with satisfactory results, but bundles of other sizes may also be suitable. A plurality of bundles 12 each in the shape of a tape may be arranged in parallel and adjacent each other so the finished composite fabric product will have a desired width or area. Reeds 16 may be optionally used to help maintain the orientation of the fibers in the bundle(s). A matrix material 18 is placed above and below the fiber bundles 12 by, for example, a reel. Preferably, the matrix material is placed both above and under the fiber bundle or bundles, but it may also be possible to use the matrix material on only one side of the fiber bundle(s). The matrix material is a thermoplastic adhesive material, examples of which include polyamide resins such as nylon-12', thermoplastic polyurethane (TPU), flexible coating of various compounds, or the like. The nylon-12 used may be a commercially available material known as Remay™. A preferred matrix material is nylon-12. Preferably, the matrix material may be provided in an amount of about 20% to 60% by volume of the matrix material to the total composite fabric finished product. More generally, the matrix material may be provided in an amount of about 5% to 60% by volume of the matrix material to the total composite fabric finished product A pair of heated pressure rollers 20 may be used to apply heat and pressure to the fiber bundle 12 and the matrix material 18. The temperature of the rollers 20 is determined by the matrix material used, and should be sufficient to melt the matrix material. For nylon-12 and TPU, the temperature may range from 310 to 380 degrees C., and is preferably about 350 degrees C. As an alternative, only one of the two rollers 20 may be heated, depending on where the matrix material is places. As another alternative, heat may be applied by a separate heating device 22 upstream from the pressure rollers 20, which are not heated. In other words, heating and applying pressure may be performed separately. Cooling occurs naturally after the ironed fiber bundles and matrix material leaves the drive rollers. Alternatively, a temperature control device (not shown) may be used to increase or decrease the rate of cooling. The pressure applied by the pressure rollers 20 is preferably between about 15 and 22 psi, and preferable about 20 psi, but other pressure outside of this range may also be used. When the pressure is too high, the matrix material 18 may stick to the rollers 20, or the fibers in the bundle 12 may start to spread. The present inventor found that the desired pressure tends to be fairly constant for the typical thicknesses of the fiber bundle and matrix materials used, as well as for the different types of fibers used (carbon, aramid, S glass and E glass, etc.).

In the device shown in FIG. 1, the pressure rollers 20 also function as drive rollers. The drive rollers 20 hold the fiber bundle 12 and matrix materials 18 and pull them in the downstream direction (away from the creel 10). Thus, the rollers 20 cooperate with the creel 10 to maintain a tension in the front portion of the fiber bundle (i.e., upstream from the rollers 20), and the heat and pressure applied to the fiber bundle and matrix material are applied while the front portion of the fiber bundle is under tension. This tension may be adjusted by adjusting a setting on the creel 10. In one specific example, Toho G30-700 fiber bundles were used, and the creel (Izumi Model BF Creel Stand) was adjusted such that the tension in the front portion of the fiber bundle was about 5 lbs per fiber bundle. A range of about 4 to 6 lbs may be suitable. Of course, the appropriate tension to be applied will depend on the type of fibers and the size of the bundle (for example, for a bundle with 300,000 to 700,000 fibers, a tension of 2–5 lbs is appropriate). Further, tension may be applied to the back portion of the fiber bundle, i.e. downstream from the rollers 20, by adjusting a setting of the take up reel. Alternatively (not shown), pressure rollers and drive rollers may be separate pairs of rollers with the pressure rollers being upstream from the drive rollers. In this configuration, the drive rollers would primarily function to pull the fiber bundle and the matrix material while the pressure rollers would primarily function to apply the pressure on the fiber bundle and the matrix material. FIG. 1 also shows a series of rollers 22 which may be optionally used to control the tension in the fiber bundles.

The speed at which the fiber bundles are pulled through the rollers 20 is not believed to be critical, although higher speeds are generally desirable as they result in higher production rates. In particular experiments, the speed at which the fiber bundles are pulled was up to 60 ft/min, the speed being limited by the speed of the particular machine used in that experiment, which was a laminator typically used in the garment industry. Higher speed are likely attainable with a different apparatus.

A key aspect of the invention is the tension applied to the fabric while heat and pressure are applied (i.e. ironing). It is believed that the tensioning changes the structure of the fibers, which in turn results in a different microscopic structure of the finished composite fabric product. Products produced by this method had been shown to have many superior physical properties.

As a result of the above-described process, the yarns (tows) are locked in place by the matrix material allowing the yarns to stay in place, which facilitates subsequent lay-up processes if such processes are carried out. The process achieves straight and parallel fiber orientation which lowers the coefficient of variation. The composite fabric materials manufactured according to embodiments of the present invention have superior tensile properties, compression properties, impact properties, and impact dispersion and propagation properties compared to composite fabric materials made with conventional methods. The present inventor has produced sample products using Toho Carbon Fibers, Inc.'s G30-700 fiber bundles, where the tensile modulus of the untreated fiber bundle is 35.0 msi and the tensile strength is 700 ksi according to the manufacturer's specifications. The average properties of the composite fabric material manufactured from such fiber bundles according to embodiments of the present invention have a tensile modulus of about 133,000 psi, a tensile strength of about 15,100,000 psi, compressive strength of about 97,600 psi, a compressive modulus of about 14,800,000 psi, a fiber weight fraction of about 49.7%, and a fiber volume fraction of about 38.4%. In general, properties of the composite fabric material manufactured from suitable fiber bundles according to embodiments of the present invention fall with the following ranges: tensile modulus: about 121224 to 207813 psi; tensile strength: about 13763021 to 23593750 psi; compressive strength: about 88958 to 152500 psi; compressive modulus: about 13489583 to 23125000 psi; fiber weight fraction: about 45.3% to 77.66%; and fiber volume fraction: about 35% to 60%.

It will be apparent to those skilled in the art that various modification and variations can be made in the method and product of the present invention without departing from the spirit or scope of the invention. Thus, it is intended that the present invention cover modifications and variations that come within the scope of the appended claims and their equivalents.

The invention claimed is:

1. A composite fabric material product comprising a plurality of parallel continuous fibers and a matrix material locking the fibers in place, the amount of the matrix material being about 5% to 60% by volume of the matrix material to the total composite fabric material, the composite fabric material having a tensile modulus of up to about 133,000 psi, a tensile strength of up to about 15,100,000 psi, a compressive strength of up to about 97,600 psi, a compressive modulus of up to about 14,800,000 psi, wherein the fibers in the bundle form a a fabric selected from a group consisting essentially of a unidirectional fabric and a woven fabric, and wherein the matrix material is selected from a group consisting of a polyamide resin, a thermoplastic polyurethane (TPU), a polyester, and a nylon-12.

2. The composite fabric material product of claim 1, wherein the amount of the matrix material is about 20% to 60% by volume of the matrix material to the total composite fabric material.

3. The product of claim 1, wherein the fibers are selected from the group consisting of carbon fibers, aramid fibers, S-Glass fibers, E-Glass fibers, and hybrids thereof.

4. The product of claim 1, wherein the fibers are carbon fibers.

5. The product of claim 1, wherein the matrix material is a thermoplastic adhesive material.

* * * * *